Nov. 11, 1930.  C. L. GIEZENTANNER  1,781,004
PLANT TREATING APPARATUS
Filed March 7, 1928
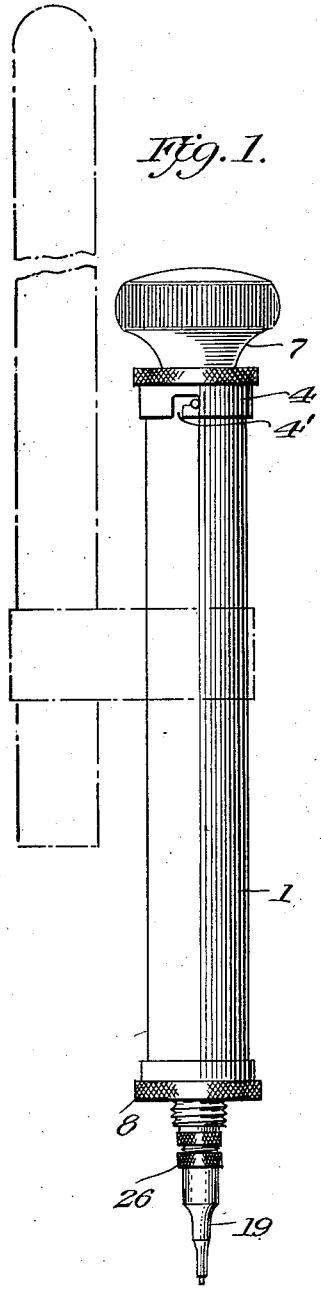
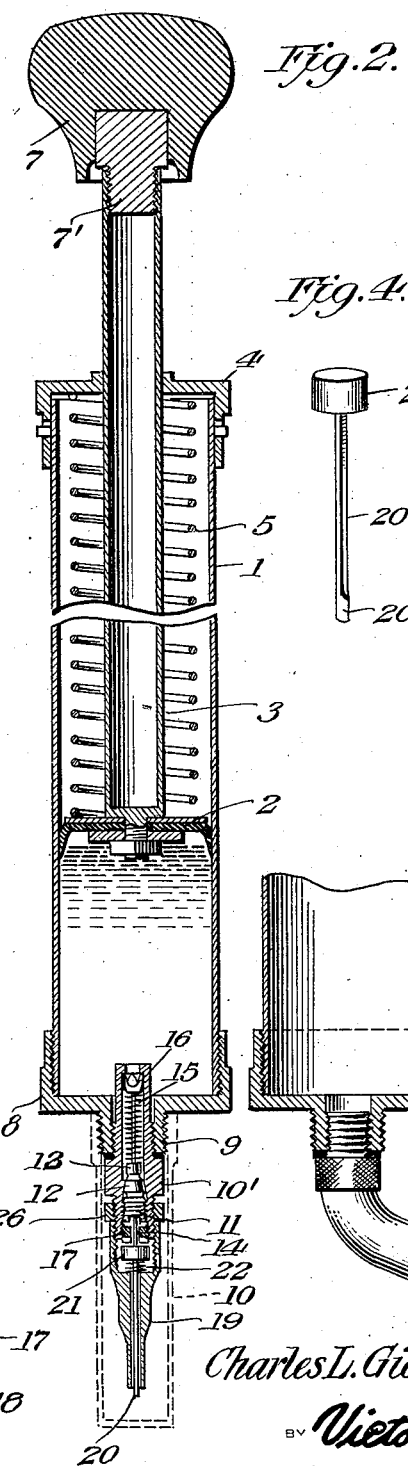
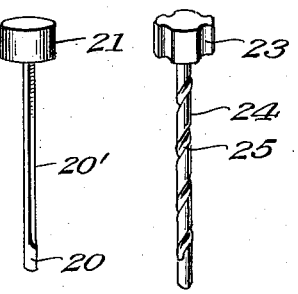
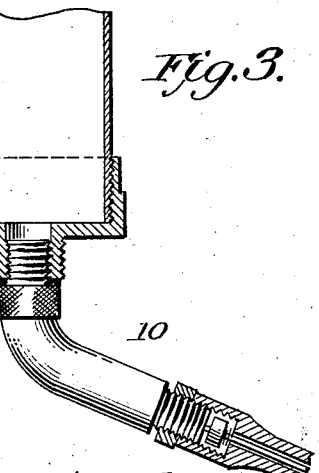
Charles L. Giezentanner
INVENTOR
ATTORNEY Patented Nov. 11, 1930

1,781,004

UNITED STATES PATENT OFFICE

CHARLES L. GIEZENTANNER, OF MONTESANO, WASHINGTON

PLANT-TREATING APPARATUS

Application filed March 7, 1928. Serial No. 259,774.

This invention relates to a device for treating plants, the general object of the invention being to provide means for injecting fluids into weeds and other plants to destroy the plants without disturbing the roots of other plants, as would occur where the plants which are to be eliminated are pulled from the ground. The device may also be used to treat the soil around the plants.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 1 is a view showing how the invention may be attached to a handle.

Figure 2 is a longitudinal sectional view through the device.

Figure 3 is a fragmentary sectional view with parts in elevation, showing a modification.

Figure 4 is a view of one of the needles used with the device.

Figure 5 is a view of another form of needle.

Figure 6 is a view of the nut in the end of the valve tube.

In these views, 1 indicates a cylinder which is adapted to contain the fluid which is to be injected into the plants. A piston 2 is arranged in the cylinder and its hollow stem 3 extends through the removable cap 4 which closes one end of the cylinder. A spring 5 is arranged on the stem between the piston and cap and tends to hold the piston in its inner position. The cap 4 is connected with the cylinder by a bayonet connection 4'.

Handle 7, having a screw plug 7' therein, is attached to the outer end of the hollow stem 3 by screwing the plug in the threaded end of the stem, the handle forming means for retracting the piston. This hollow stem forms a receptacle for carrying extra needles, valves, etc.

A cap 8 is screwed to the other end of the cylinder and said cap is formed with a nipple 9 which is threaded internally and externally, the external threads being adapted to receive the internal threads on a dust cap 10 which encloses the needle and valve carrying parts. A valve carrying tube 10' is threaded externally to engage the internal threads of the nipple and the outer end of this tube is threaded externally and internally, the internal threads receiving the nut part 11 of a valve seat 12, which is provided with an exterior gasket to engage a beveled part of the bore of the tube 10'. The valve 13 is attached to a stem 14 which passes through the parts 11 and 12 and this stem also carries the spring 15 and its seat 16, the spring acting to press the valve 13 against the seat 12. These parts are similar to the well known valve used in the valve stems of tubes for pneumatic tires. A nut 17 is threaded in the outer end of the tube 10' and forms a removable and adjustable stop, this nut and the nut member 11 being formed with projections 18 so that they can be put in place and removed by an ordinary valve stem cap which may be placed in the hollow stem when not in use. Instead of making the tube 10' straight, it may be made curved, as shown at 10' in Figure 3.

A nozzle 19, having a large socket in its inner end, the walls of which are screw threaded, is placed on the end of the tube 10' or 10'' by having its internal threads engage with the external threads on the outer end of the tube. The outer end of the nozzle is small enough to penetrate a plant and a needle 20 is placed in the bore of the nozzle, said needle having a large base 21 which is located in the socket of the nozzle, a coil spring 22 being placed on the needle and bearing against the base and the bottom of the socket for holding the base against the outer end of the stem 14. The spring 15 is of greater strength than the spring 22 so that said spring 15 normally holds the valve 13 upon the seat 12, but when the nozzle is forced into a plant, the pressure on the outer end of the needle 20 will cause the base 21 to push the stem inwardly and thus force the valve 13 off its seat so that the fluid in the cylinder which is held under pressure by the piston and its spring will pass through the tube 10' and through the nozzle and thus be ejected into the plant. As will be understood this fluid passing the valve 13 will flow through the valve seat 12 and the member 11 and through the opening in the nut 17 into the nozzle and finally escape from the nozzle. As before stated this valve assembly is the same as that used in the valve stems of pneumatic tires and is known as the Schrader valve. As soon as the nozzle is pulled from the plant, the pressure of the spring 15 will close the valve and thus stop further discharge of the liquid.

The needle shown in Figures 2 and 4 is formed with one or more flat sides 20' to permit the escape of the liquid through the bore of the nozzle, the large outer end of the needle acting to prevent any parts of the plant from entering the nozzle and clogging the same.

Figure 5 shows a modified form of needle in which the base is provided with recesses 23 to permit passage of the liquid past the base and the stem 24 is provided with the spiral groove 25 through which the liquid can pass through the nozzle. As will be seen, the nozzle is adjustable on the tube and it is locked in adjusted position by the lock nut 26. By making the nozzle removable, the desired kind of needle can be substituted for the needle already in the nozzle by simply removing the nozzle from the tube.

The discharge of the liquid is determined by the size and design of the needle and its base and by the adjustment of the nut 17 and also by the position of the nozzle on the tube. This device is self-cleaning, is automatic in operation and the spring pressed piston provides a positive discharge as it keeps the contents under continual pressure. The device can be used in any position and it is designed to treat plants or the like or the soil around the plants.

The device is especially designed for use in thinning plants in a row or bed, such as onions and the like. In this case, the onion plants or other plants which are to be removed are operated upon with the device, so that the liquid will kill them and thus it is not necessary to pull these plants up by the roots which would disturb the roots of the remaining plants and thus interfere with their growth.

It is thought from the foregoing description that the advantages and novel features of my invention will be readily apparent.

It is to be understood that I may make changes in the construction and in the combination and arrangement of the several parts, provided that such changes fall within the scope of the appended claims.

What I claim is:—

1. A device of the class described comprising a cylinder, a spring pressed piston therein, a handle for retracting the piston, a tubular member at the discharge end of the cylinder, a nut screwed in the outer end of said tubular member, a valve seat carried by the nut, a spring pressed valve stem in the tubular member, passing through the seat and the nut, a valve on the stem pressed against the seat by the spring on the stem, a nut screwed in the outer end of the tubular member in front of the first nut, a nozzle threaded to the outer end of the tubular member, a needle passing through the bore of the nozzle and having an enlarged base and a spring for pressing the base against the end of the valve stem.

2. A device of the class described comprising a cylinder for containing liquids, having a discharge nozzle at one end, a plunger in said cylinder, a handle connected to said plunger and projecting from the end of the cylinder opposite said plunger, a valve controlling the discharge through said nozzle from the cylinder, and a needle projecting through said nozzle and operatively disposed relative to the valve to unseat the same when its projecting end is pressed against an object.

3. A device as in claim 2, including spring means operable upon the plunger to maintain the liquid under pressure constantly.

4. A device of the character described comprising a container for liquids having a discharge nozzle, means for maintaining the contained liquid under pressure constantly, means including a handle projecting opposite from the nozzle for increasing the pressure on the liquid at will, valve means to control the discharge of liquid, and a needle projecting from the nozzle, and operatively connected to the valve means to unseat the same upon pressing the needle against an object.

5. A device of the class described comprising a cylinder, a piston therein, a hollow stem for the piston passing through one end of the cylinder, a handle having a threaded plug therein threaded in the outer end of the stem, said stem forming a receptacle for extra parts, a spring on the stem pressing the piston inwardly, a tubular member threaded to the outlet end of the cylinder, a nozzle threaded on the outer end of the member, a valve removably arranged in the tubular member, a needle in the nozzle having its inner end engaging the outer end of the stem, with the outer end of the needle projecting beyond the outer end of the nozzle, a spring for holding the needle against the stem, a spring for normally holding the valve on its seat and the stem in its outward position and a covering cap for the nozzle and tubular member.

In testimony whereof I affix my signature.

CHARLES L. GIEZENTANNER.